United States Patent [19]

Esmond

[11] 4,212,538
[45] Jul. 15, 1980

[54] METHOD AND APPARATUS FOR TESTING PRESCRIPTION GLASSES AND OTHER DUAL LENSES OPTICAL DEVICES

[76] Inventor: William G. Esmond, 800 Country Club Rd., Havre de Grace, Md. 21078

[21] Appl. No.: 964,607

[22] Filed: Nov. 29, 1978

[51] Int. Cl.² .............................................. G01B 9/00
[52] U.S. Cl. ................................................... 356/127
[58] Field of Search ........................ 356/127, 144–146

[56] References Cited

U.S. PATENT DOCUMENTS 4,098,002  7/1978  Campbell et al. ............... 356/127 X Primary Examiner—John K. Corbin
Assistant Examiner—Bruce Y. Arnold
Attorney, Agent, or Firm—Charles E. Brown

[57] ABSTRACT

A method of and apparatus for testing the optical axis of an optic device having respective left and right lenses. The apparatus is designed to simulate respective left and right axes of vision which intersect at a focal point lying on a central axis of the optical device. Two collimated light beams such as are produced by a laser are projected to pass through respective equally spaced points, lying on opposing sides of the central axis, with a distance spanning therebetween and intersecting at the focal point. The distance spanning between the spaced points is the interpupiliary distance measurement pertaining to a particular set of prescribed measurements. The apparatus includes supporting structure for retaining an optic device made according to the set of prescribed measurements. The supporting structure positions the optic device in a position normal to the central axis. An optic device which has been properly made will allow the two light beams to intersect at the focal point when positioned upon the supportive structure.

11 Claims, 5 Drawing Figures

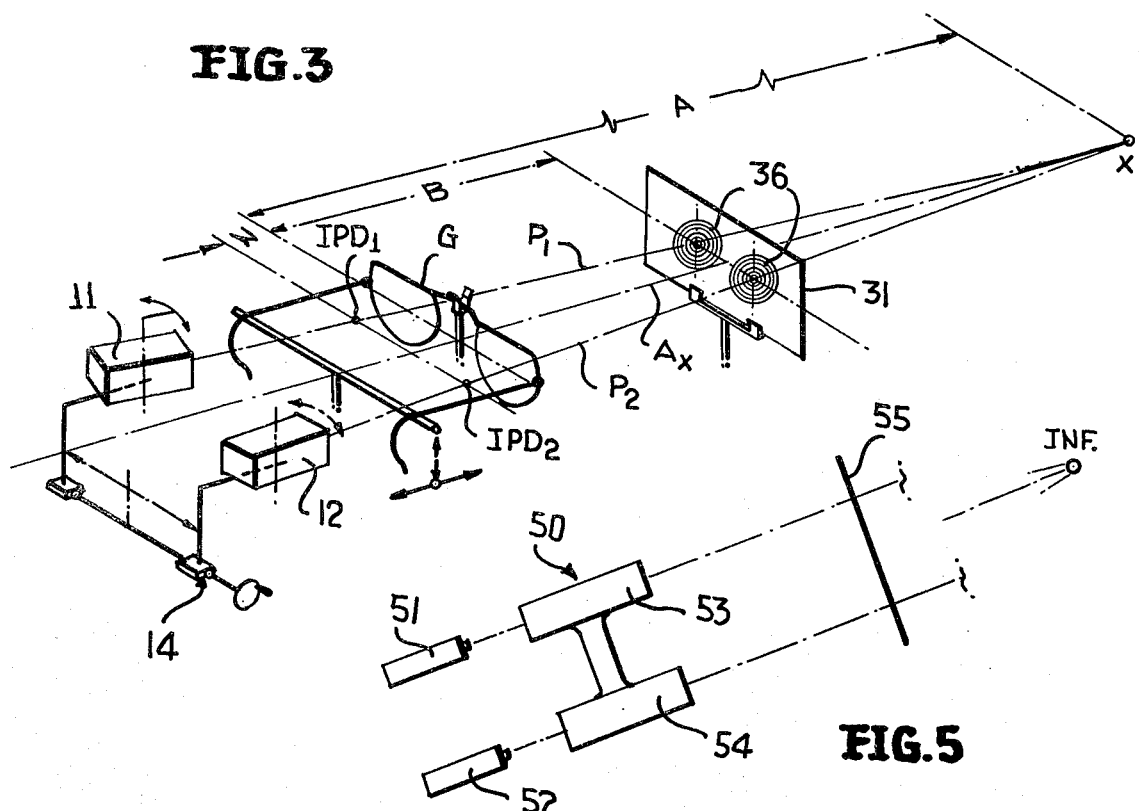
FIG.3
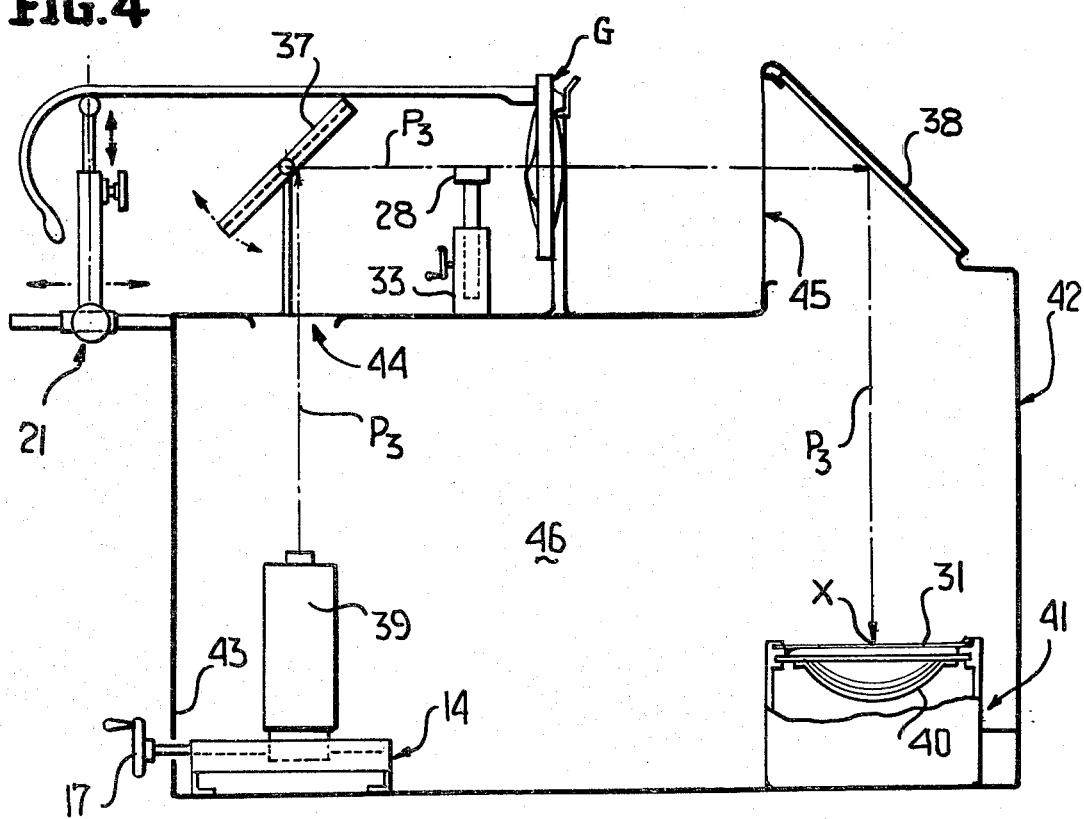
FIG.5
FIG.4

METHOD AND APPARATUS FOR TESTING PRESCRIPTION GLASSES AND OTHER DUAL LENSES OPTICAL DEVICES

Briefly, this invention relates to an apparatus for testing eyeglasses, particularly prescription eyeglasses, which are corrective for reading and distance viewing, although the apparatus may be also used to test proper focusing of a pair of binoculars.

When an individual has his eyes checked for reading and distance viewing, each eye is corrected for its particular deficiency and a corrective lens prescribed therefor. At the time of testing, not only is each individual eye tested, but upon having each eye fitted with a properly corrective lens, then the pair of eyes in unison are tested for focusing relative to the reading or distance viewing deficiency. The coordination of the optical axis of one's eyes relative to reading and viewing distances is dependent upon the I.P.D., which is the patient's actual interpupiliary distance. The lines of sight associated with each pupil should pass through the optical center of the respective corrective lenses and converge at a point beyond the prescription glasses in order to avoid the addition of a prism effect of the lenses. To assure that respective prescription lenses will provide proper reading and distance viewing focus and axis alignment, the respective prescription lenses should be mounted within an eyeglass frame in a relationship that simulates a patient's actual I.P.D. The I.P.D. usually averages between 55 and 57 millimeters.

In constructing lenses, current testing procedures provide several methods by which proper focus of a single lens can be readily determined within close tolerances. A basic problem with the making of prescription glasses is that spacing of the axial center of the respective lenses within an eyeglass frame may not be identical to the I.P.D. per prescription. Any misalignment relative to the I.P.D. and mounting of the lenses will cause distortion and improper focusing by introducing an unwanted prism effect, especially with relatively thick lenses.

In determining that a pair of prescription glasses have been made in accordance with the prescription, there are several techniques available which assure that a corrective lens is made within tolerance. Despite these available modern techniques, there has arisen a need to test glasses for proper focusing and axial alignment due to tolerance differences associated with individual lens and frame making and the combination thereof, which may lead to improper focusing.

For example, assume that there is allowed a plus or minus ten percent tolerance factor in the making of a corrective lens, and further, that such a lens actually has a positive ten percent error. Also assume that a particular eyeglass frame for mounting respective corrective lenses therein has been made within a plus or minus ten percent tolerance factor and actually has a positive ten percent error factor. The combination of the plus ten percent error of the corrective lenses mounted within the plus ten percent error of the eyeglass frame results in a combined condition which is unacceptable with regard to respective lines of sight associated with the respective left and right eyes. When viewing through the respective left and right corrective lenses of the prescription glasses having the above-mentioned tolerances, proper focusing will not be provided. Distortion will occur when light passing through each lens is bent away from the normal viewing axis per the prescription.

It is well known in the field of optics and lens making that light which passes directly through the optic axis of a lens will not be bent or refracted, but will pass straight through and out the other side of the lens. It is also known that in determining the proper corrective lens for an eye prescription, careful consideration must be given to the I.P.D. measurement which involves the measurement of the spacing between the actual center of the left and right eyes. Based upon the individual's I.P.D. measurement, the corrective lenses should be mounted within a glass framework such that the optic axes of the respective mounted lenses should lie along the intended wearer's sight axes. If this condition is not satisfied, it can result in having a pair of prescription glasses which provide a slight and in some cases severe distortion of the sight axis, the distortion being greater with lenses of greater dioptic refraction.

In determining the particular corrective lenses which should be used for an individual relative to reading, as well as distance viewing prescription glasses, it is accepted that a distance of sixteen inches from the center of the corrective lens would be used for reading focus determination and a distance of sixteen to twenty feet for distance viewing focus. It is, therefore, particularly necessary to assure that the corrective lenses are properly spaced for axis alignment before issuing the prescription glasses and, hopefully, to prevent further need of correction.

It is, therefore, an object of this invention to provide an apparatus utilizing laser beams which will simulate and test an optic device having respective left and right single and multiple pairs of lenses mounted therein for proper alignment relative to a reading as well as a distance focal point.

Another object of this invention is to insure that the respective lenses have been made in accordance with a particular set of prescribed measurements, and that the respective lenses are properly mounted in spaced relationship relative to the I.P.D. of the set of measurements.

With the above, and other objects in view that will hereinafter appear, the nature of the invention will be more clearly understood by reference to the following detailed description, the appended claims and the several views illustrated in the accompanying drawings.

IN THE DRAWINGS

FIG. 3 is a perspective view of the apparatus and shows the apparatus being used to test the axes of eyeglass lenses of glasses for distant viewing.

FIG. 4 is a side elevational view of another embodiment of the apparatus and shows a manner by which proper reading and distance axes relationship may be determined by using reflective surfaces and a recording medium.

FIG. 5 is a schematic perspective view showing the testing of an optical device having dual axes which intersect at infinity.

Figure 1:
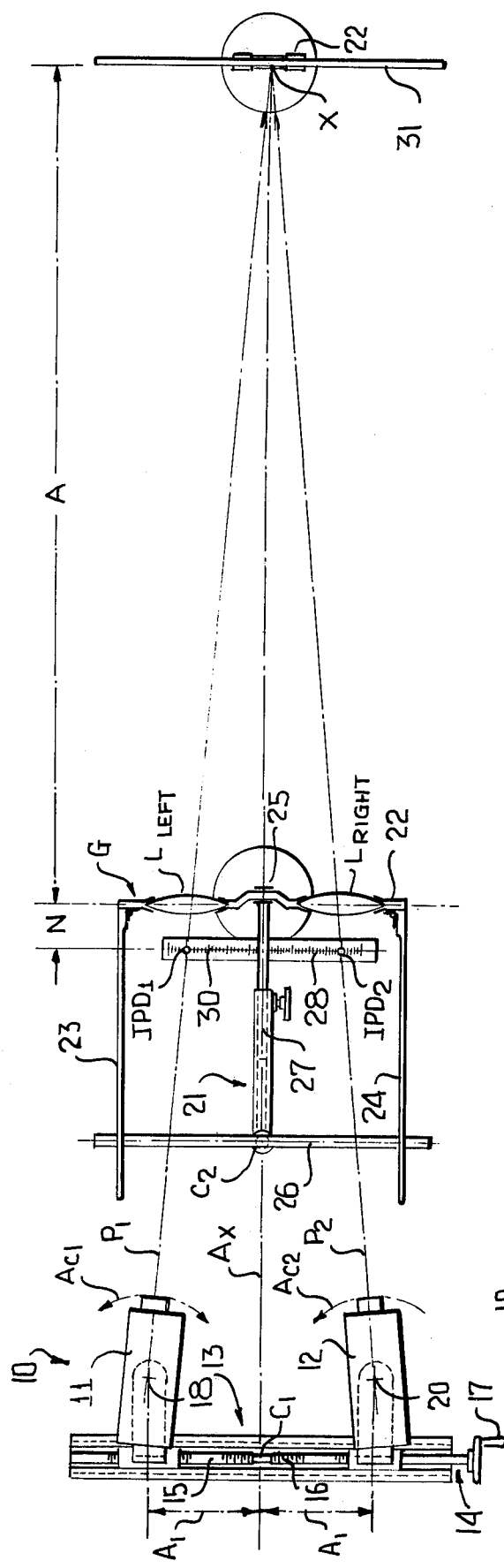
FIG. 1 is a top plan view of the apparatus having a pair of prescription glasses mounted therein to simulate lines of sight converging at a focal point.

A preferred embodiment of the apparatus is shown in FIG. 1 of the drawings and is generally designated by the reference numeral 10. The apparatus 10 is suitably constructed to test the axes relationship of an individual's respective left and right corrective lenses of a pair of prescription glasses. A pair of respective laser beam sources 11 and 12, which represent the axial beam extensions of an individual's left and right eyes when aligned for most distinct vision of an object, are adjustably mounted upon a first supporting structure or base 13. The first supporting structure 13 includes suitable adjusting means 14 which may be in the form of rack and pinion assemblies 15 and 16 which are interconnected at point $C_1$. The rack and pinion assemblies 15 and 16 move back and forth in a direction indicated by arrows A1. Movement of the adjusting means 14 causes each respective rack and pinion assembly 15 and 16 to move in equally spaced relationship with each other relative to a central axis Ax which passes perpendicularly through point $C_1$.

Respective bases or mounting pedestals 18 and 20 are suitably connected to respective rack and pinion assemblies 15 and 16, and are constructed to suitably support in a mounted position respective laser beam units 11 and 12. The respective laser beam units 11 and 12 are pivotally mounted on the respective support bases 18 and 20, and are capable of being moved through an arc generally referred to as Ac1 and Ac2.

Respective laser beam units 11 and 12 are capable of producing collimated light beams (not illustrated) along respective paths P1 and P2. The paths P1 and P2 simulate left and right pupils of an individual for whom a pair of prescription glasses have been made. The paths P1 and P2 will be positioned in such a manner that they intersect each other at a point along the central axis Ax remote from their respective laser beam units 11 and 12, this point being generally designated by the letter X.

In addition to the above, the light beam paths P1 and P2 must also be respectively passed through respective I.P.D.1 and I.P.D.2 points. The term I.P.D. refers to the interpupiliary distance measurement which has been obtained for the individual for whom the prescription glasses have been made. On the average, the I.P.D. measurement normally ranges between 55 and 57 millimeters. The measurement of the I.P.D. is particularly important in that a pair of prescription glasses must be made having the corrective lenses mounted therein with the lenses' optic axes aligned with respective outer dimensions of the individual's I.P.D. The outer measurement of the individual's I.P.D. is generally referred to by reference to the I.P.D.1 and I.P.D.2. The respective I.P.D.1 and I.P.D.2 are equal measurements of the individual's overall I.P.D., and are equally spaced from the central axis, Ax.

In the determination of the proper corrective lens for an individual's sight problem, focusing of the individual's eyesight is based on a distance from the pupils to the center of the eyeglass lenses, generally designated by the letter N, and an accepted distance from the center of the lenses to the focus point X, which is generally designated by the letter A. When testing an individual for proper reading focusing relative to the focus point, X, the distance A is on the order of 16 inches. When determining proper distance focusing relative to the focus point X, the viewing distance A will be on the order of 16 to 20 feet. The distance from the individual's pupil to the center of the eyeglass lenses is dependent upon the individual's positioning of the glasses on his nose with respect to his pupils. Therefore, in view of the above-mentioned distances, the apparatus 10 must be set up to simulate the distances relative to the individual's prescription for whom the glasses have been made.

The apparatus 10 includes a suitable second supporting structure or base 21 which is capable of supporting a pair of glasses, G, squarely with respect to the central axis Ax and the first supporting structure 14. The second supporting structure 21 has a central axis, generally referred to by C2. The second supporting structure 21 is aligned with respect to the central axis Ax by positioning the central axis C2 to lie parallel and along the central axis Ax.

The eyeglasses G have lenses L-left and L-right mounted within a frame 22 which has left and right earpieces 23 and 24 depending therefrom. In order that a pair of glasses G may be squarely mounted within the second supporting structure 21, the second supporting structure 21 is constructed with a support ridge 25 for engagably supporting the eyeglass frame 22, and a supporting bar 26 for adjustably supporting the left and right earpieces 23 and 24. The second supporting structure 21 also includes adjusting means 27 disposed between supporting base 25 and supporting rod 26 for adjustably moving the supporting rod 26 to position the left and right earpieces 23 and 24 wherein the glass frame 22 is maintained in a position normal with the central axis Ax.

The apparatus 10 includes a calibration means or scale 28 having calibration points or marks 30 thereon. The calibration means 28 is disposed transversely with respect to the central axis Ax with the central axis Ax being a zero starting point. The calibration points 30 are several equally spaced and opposed points lying on opposite sides of the central axis Ax.

In setting up the apparatus 10 to determine if a particular pair of prescription glasses will properly align the visual axes of a user's eyes within the required distance relative to reading or distance viewing requirements, the following steps should be taken. First, after careful consideration of the prescription, one should select the proper calibration points 30 which correspond to the I.P.D. relative to the glasses to be tested. Secondly, the support base 25 should be adjusted with respect to the distance N simulating the distance from the individual's pupils to the positioning of the eyeglasses G upon the individual's nose. Thirdly, the focusing point X at which the respective light beams pass P1 and P2 will intersect, should be set the accepted distance A for respective reading and distance viewing. The accepted distance A for reading is sixteen inches, while the accepted distance A for distance viewing is on the range between sixteen and twenty feet. Finally, the respective laser beam units 11, 12 should be moved into position to allow the laser beam unit 11 to cast a light beam along a path P1, passing through point I.P.D.1 and the focus point X, then the laser beam unit 12 should be directed to cast the light beam therefrom along the path P2 passing through the point I.P.D.2 and intersect with the respective path P1 at the focus point X.

Once the apparatus 10 has been set up in accordance with the prescription, the pair of eyeglasses G also made in accordance with the prescription may be affixedly retained to the second supporting structure 21 and respective light beams may be cast along their respective paths P1 and P2. If the particular eyeglasses G have been properly made in accordance with the prescription, the respective light beams will pass through the respective optic axis of left and right lenses to intersect at the focus point X. If the eyeglasses G have not been made in accordance with the prescription, then the respective light beams passed along their respective paths P1 and P2 will not pass through the respective optic axes of the left and right lenses, and tending distortion of the respective beams will occur due to a prism effect and thus will result in their failure to intersect at the focus point X.

The focusing alignment point X should fall upon a surface 31 which may be in the form of a wall or screen. In the case that the surface 31 is a screen having a reticle pattern, the surface 31 may be suitably mounted with a third supporting structure or base 32.

Figure 2:
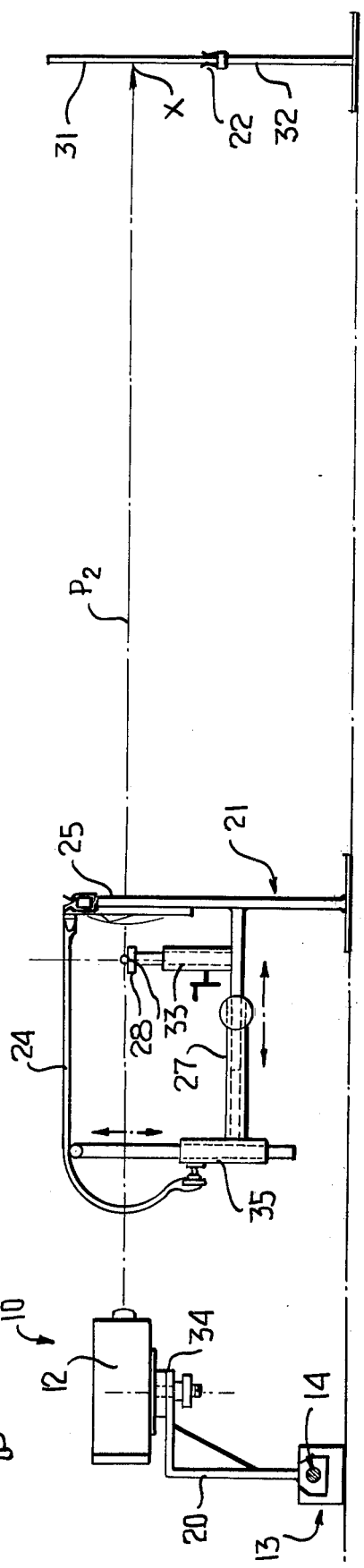
FIG. 2 is a side elevational view of the apparatus and illustrates a form of mounting the prescription eyeglasses for simulating and determining proper converging of the focus point.

The apparatus 10, as illustrated in FIG. 2, has been set up to accommodate a pair of eyeglasses. The apparatus 10 will include adjusting means 33 connected to the second supporting structure 21 and the calibration means 28 for vertically centering the calibration means 28 with respect to the central axis of the eyeglasses G. The apparatus 10 also includes adjusting means 34 for vertically moving the respective laser beam units 11 and 12 whereby when respective light beams are generated along respective paths P1 and P2, respective light beams will be cast through the central axis of the eyeglasses G. A suitable adjusting means 35 may also be employed to provide vertical adjustment of the support bar 26, and thereby enable finer adjusting support relative to the supporting of the respective left and right earpieces 23 and 24.

Although not specifically limited to the abovedescribed embodiment as referred to in FIG. 2 of the drawings, it should be noted that the adjusting movement relative to the laser beam units 11 and 12, the calibration means 28, and the pair of eyeglasses G can be performed in any manner deemed desirable. Therefore, this particular invention is not necessarily limited and it is deemed possible to adapt the apparatus 10 as described to accommodate different size glasses while maintaining the respective laser beam units 11 and 12 as well as the calibration means 28 in set positions.

It should also be noted that in setting up the apparatus 10 relative to a central axis Ax and the following three points, I.P.D.1, I.P.D.2 and the focus point X, all points are positioned with respect to the central axis Ax. Intersecting lines generated with respect to the three abovementioned points create a triangle which when divided by the central axis Ax provides two equal and similar triangles. The result being that at any particular distance along the central axis Ax, a line may be drawn perpendicular with respect thereto and the line will provide equal outer dimensions of the distance from the central axis Ax to the respective paths P1 and P2. Therefore, it is deemed possible to take a surface 31 having equally spaced target marking 36 in a reticle pattern positioned thereon, and position the surface 31 at a distance closer to the pair of glasses G, which is generally designated by the letter B. The results would be the same and determination of the proper focusing relative to the glasses G would be performed in a limited amount of space.

Referring to FIG. 4 of the drawings, there is shown a more compact embodiment of the present invention. With the utilization of respective first and second reflective surfaces 37 and 38, a single laser beam unit 39 may be positioned with respect to the second supporting structure 21 upon which a pair of glasses G is fixably retained. The first reflective surface 37 will be positioned upstream from the one laser beam unit 39 to receive a respective light beam when cast along a path P3. The first reflective surface having received the light beam along the path P3, then splits the light beam to be cast along two separate reflected paths P4 and P5. The first reflective surface 37 is adjustable to direct the reflected light beam paths P4 and P5 in equally spaced relationship relative to a central axis of the first reflective surface 37 lying in alignment with the central axis of the second supporting structure 21. The beam paths P4 and P5 are passed through their respective I.P.D.1 and I.P.D.2 points on the calibration means 28, and received by the second reflective surface 38. The second reflective surface having received the beam paths P4 and P5, reflects them at a suitable angle therefrom to be cast upon the surface 31. The surface 31 has the appropriate target marking 36 thereon for the particular distance being used.

A suitable recording medium of the light sensitive type, such as a self-developing film pack, may be positioned behind the surface 31 for the purpose of recording the reflected paths P4 and P5 cast relative to the focusing point X. The recording medium 50 is housed in a closed chamber 41 in order that exposure to undesired light rays be minimized.

The supporting structure, as illustrated in FIG. 4, may be in the form of a single supporting structure, generally referred to by the reference numeral 42. The supporting structure 42 is in the form of a closed chamber having respective openings 43, 44 and 45 positioned therein. The supporting structure 42 also has an inner chamber 46. As shown in FIG. 4 of the drawings, the chamber interior 46 can suitably house the one laser beam unit 39 with the adjusting means 14 suitably mounting the one laser beam unit 39 therein, and the crank assembly 17 for adjusting the adjusting assembly 14 is disposed to extend through the opening 43 of the chamber 42.

The light beam path P3 will be directed through the opening 44 to strike the first reflective surface 37 mounted in an area outside the chamber 42. The second supporting structure, generally referred to by reference numeral 21 as previously described, may also suitably be constructed to depend from the exterior of the closed chamber 42. The reflected light beam paths P4 and P5 which are produced by the first reflective surface 37 will be passed through the opening 45 and strike the second reflective surface 38 which is permanently secured at a fixed angle within the closed chamber 42. The reflected light beams P4 and P5 from the second reflective surface 38 will be directed upon the surface 31 and recorded on the recording medium 40 housed within the recording medium closed chamber 41.

Although the invention has been specifically illustrated and described with respect to the testing of prescription eyeglasses, it is to be understood that the invention is not so limited. The same testing concept may be utilized with dual axes optical devices of other types. For example, binoculars, telescopes with finder scopes, and like optical devices may be tested in a similar manner. As is schematically illustrated in FIG. 5, a dual axes optical device identified by the numeral 50 may be tested by providing two laser sources 51, 52 which are spaced apart a distance equal to the spacing of the optical axes of the device 50 and aligned therewith. The axes of the light beams from the lasers 51, 52 are adjusted to intersect at infinity so as to be coincident with the optical axes of the device 50 if the optical axes 53, 54 are properly adjusted. This can be readily determined by determining the distance between the optical axes 53, 54, so adjusting the spacing of the axes of the lasers 51, 52 and projecting the light beams of the lasers through the optical device 50 and onto a screen 55 which corresponds to the screen 31.

The illustrated optical device 50 is only schematically shown and may be binoculars, a telescope with a finder scope, or a similar optical device having plural axes which intersect at infinity.

Although a preferred embodiment of the invention has been specifically illustrated and described herein, it is to be understood that minor variations may be made in the method and apparatus without departing from the spirit and the scope of the invention, as defined in the appended claims.

I claim:

1. An apparatus for testing the alignment of a multi-beam optic device having respective left and right lenses made in accordance with a set of prescribed measurements, said apparatus comprising: at least one light source capable of directing collimated light beams along two separate paths, said paths being equally spaced on opposite sides of a central axis, said paths intersecting at a remote point lying on said central axis; supporting structure for fixably retaining an optic device to be tested in a position normal to said central axis wherein one of said light beams will pass through the left lens while the other of said light beams passes through the right lens; adjusting means for effecting relative movement between said light source and said supporting structure to align said respective light beam to pass directly through the optic axis of the respective lenses when the optic device is properly positioned; calibration means adjustably positioned normal with respect to said central axis and between said light source and said supporting structure, said calibration means having several equally spaced markings representative of measurements by which one may determine the spacing between said light beam paths and readily compare the spacing with a set of prescribed measurements for determination of proper focus for the optic device.

2. The apparatus of claim 1 wherein said calibration means is positioned relative to the positioned optic device, thereby simulating the axial spacing between a viewer's eyes and the optic device when in use.

3. The apparatus of claim 1 wherein said light source includes two light units each capable of casting a respective light beam, said respective light beams being cast along said respective paths.

4. The apparatus of claim 1 wherein said light source includes a single light unit capable of producing a single collimated light beam, and a beam splitter for receiving said single beam and creating two separate beams therefrom to be directed along said respective paths.

5. The apparatus of claim 4 wherein said beam splitter has a first reflective surface for receiving said single light beam and casting said two beams at a 90 degree angle with respect to said single beam wherein said two beams will pass through the optice device and intersect at said point.

6. The apparatus of claim 5 wherein said apparatus includes a surface whereupon said point will fall.

7. The apparatus of claim 6 wherein said surface is mounted upon a base, there are means mounting said base for adjustable movement with respect to the positioning of the optic device whereby said surface may be positioned various distances from the positioned optic device; and said surface has two spaced target markings thereon, corresponding to a spacing between said respective paths at that particular positioning of said surface.

8. The apparatus of claim 7 wherein said apparatus includes recording means positioned directly adjacent said surface, and wherein said recording means includes means for recording the relationship of two light beams cast upon said surface.

9. The apparatus of claim 8 wherein said apparatus includes a second reflecting surface positioned between said optic device supporting structure and said surface, said second reflective surface being positioned for receiving light beams passed through respective optical device lenses and for directing said light beams at a preselected angle to fall upon said surface.

10. The apparatus of claim 1 wherein said light source is a laser.

11. A method of testing prescription glasses and the like having lenses mounted therein for proper focusing during both reading and distance viewing wherein testing is based upon Inter Pupiliary Distance (I.P.D.) relative to an individual's prescription in relation to a respective focus point, said method comprising the steps of:

(a) directing two collimated light beams along separate paths in equal and opposed relationship relative to a central axis lying in a plane;

(b) aligning each light beam to pass through respective first and second points wherein each respective first point is an equally spaced distance according to the I.P.D. of the prescription, and each respective second point is one and the same and lies on the central axis at a given distance from an imaginary line which passes through each respective first point and is normal to the central axis; and (c) mounting a pair of prescription glasses pertaining to the particular I.P.D. in such a manner so that the glasses are square with respect to the central axis, so that each respective light beam will pass directly through the respective lenses, and so that, if the glasses have been properly made, each respective light beam will pass directly through each respective lens without deviation and intersect at the second point.

* * * * *